US012416193B2

(12) United States Patent
Keßler et al.

(10) Patent No.: US 12,416,193 B2
(45) Date of Patent: Sep. 16, 2025

(54) LINEAR DRIVE FOR A CLOSURE ELEMENT OF A MOTOR VEHICLE

(71) Applicant: Stabilus GmbH, Koblenz (DE)

(72) Inventors: Jonathan Keßler, Gemünden (DE); Martin Neitzert, Urbach (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 18/629,568

(22) Filed: Apr. 8, 2024

(65) Prior Publication Data

US 2024/0344379 A1 Oct. 17, 2024

(30) Foreign Application Priority Data

Apr. 13, 2023 (DE) ......................... 102023109300.2

(51) Int. Cl.
*E05F 15/60* (2015.01)

(52) U.S. Cl.
CPC ......... *E05F 15/60* (2015.01); *E05Y 2201/474* (2013.01); *E05Y 2600/636* (2013.01)

(58) Field of Classification Search
CPC ....... E05F 15/622; E05F 1/105; E05F 1/1041; E05F 15/60
See application file for complete search history.

(56) References Cited

U.S. PATENT DOCUMENTS 6,516,567 B1 * 2/2003 Stone .................... E05F 15/622 49/343
2006/0042166 A1 * 3/2006 Berklich ............... E05F 15/622 49/340
2017/0089113 A1 * 3/2017 Katsuyama ........... E05F 15/622
2017/0114580 A1 * 4/2017 Dietzel ................. E05F 15/622
2020/0232267 A1 * 7/2020 Rehm ................... E05F 1/1058
2021/0270075 A1 * 9/2021 Sakiyama ................. F16F 9/32
2022/0049533 A1 * 2/2022 Keßler .................. E05F 15/622
2022/0341246 A1 10/2022 Fu
2023/0175302 A1 * 6/2023 Schneiderbanger .... E05F 1/105 49/324

FOREIGN PATENT DOCUMENTS

DE 102019128243 A1 4/2021
DE 102020111986 A1 11/2021
DE 102020112977 A1 11/2021
DE 102020132508 A1 2/2022
DE 102020122941 A1 3/2022
DE 102021129820 A1 5/2023

OTHER PUBLICATIONS

German Search Report dated Jan. 8, 2024 for related German Patent Application No. 10 2023 109 300.2, 8 pages.

* cited by examiner

*Primary Examiner* — Gregory J Strimbu
(74) *Attorney, Agent, or Firm* — Hovey Williams LLP; Kameron D. Kelly

(57) ABSTRACT

A linear drive (100) for moving a closure element of a motor vehicle relative to a body of the motor vehicle. The linear drive (100) includes an outer tube (110), an inner element (120) arranged in the outer tube (110), wherein the inner element (120) is telescopically extendable along a drive axis (A) of the linear drive (100) from an outlet end of the outer tube (110), and wherein an inner connecting element (128) is fixed to the end of the inner element (120) which is extendable from the outer tube (110), a screw spring (130) is disposed between the inner element (120) and the outer tube (110), an inner support element (122) is fixed to the inner element (120) and an outer support element (111) is fixed to the outer tube (110).

14 Claims, 3 Drawing Sheets

LINEAR DRIVE FOR A CLOSURE ELEMENT OF A MOTOR VEHICLE

CROSS-REFERENCE TO RELATED APPLICATIONS

This U.S. patent application claims priority to German Patent Application No. 102023109300.2, filed on Apr. 13, 2023, which is hereby incorporated by reference in its entirety.

BACKGROUND

The invention relates to a linear drive for moving a closure element of a motor vehicle relative to a body of the motor vehicle. The linear drive comprises an outer tube, an inner element arranged at least partially in the outer tube, wherein the inner element can be extended telescopically along the drive axis from an outlet end of the outer tube, and wherein an inner connecting element for connecting the linear drive to the closure element or to the body is attached to the end of the inner element that can be extended from the outer tube, a screw spring arranged radially relative to the drive axis between the inner element and the outer tube, an inner support element fixed to the inner element coaxially with the drive axis, and an outer support element fixed to the outer tube coaxially with the drive axis, wherein the screw spring is clamped coaxially with the drive axis between the inner support element and the outer support element.

Patent application DE 10 2020 132 508 A1 discloses a linear drive of the same type in which a screw spring is clamped between two guide elements. As the guide elements are usually made of plastic, in the event of a fire, the guide elements may melt and therefore no longer be able to hold the screw spring in place, such that the screw spring can escape from the linear drive in an uncontrolled manner. The screw spring can damage surrounding components.

Another linear drive is known from patent application DE 10 2019 128 243 A1, which differs from a linear drive of the same type in particular in that the screw spring is not arranged radially between the inner element and the outer tube, but radially outside the outer tube. This results in a less compact design of the linear drive. DE 10 2019 128 243 A1 discloses a spring locking element fixed to the outside of a drive end of the outer tube opposite the outlet end, which is intended to prevent unintentional expansion of the screw spring in the event of fire.

SUMMARY

The object of the invention is to create a simple and compact linear drive with increased safety in the event of fire.

The present invention provides a linear drive in accordance with claim 1, which achieves the technical object. Advantageous designs are the subject matter of the dependent claims.

The linear drive is designed for moving a closure element, for example a door or a flap, of a motor vehicle relative to a body of the motor vehicle. Depending on the connection of the linear drive with the closure element and the body, the movement may comprise a translation and/or a rotation of the closure element relative to the body. The motor vehicle is, for example, a passenger car, a truck or a bus.

The linear drive comprises an outer tube, for example hollow cylindrical in shape. For example, the outer tube is made of a metal, in particular steel, to transmit the forces applied by the linear drive. For example, the outer tube is coaxial to a drive axis of the linear drive.

The linear drive comprises an inner element arranged at least partially in the outer tube. The inner element is preferably cylindrical, in particular hollow cylindrical, in shape and/or arranged coaxially in the outer tube. For example, the inner element is made of a metal, in particular steel, to transmit the forces applied by the linear drive.

The inner element is guided along the drive axis of the linear drive such that the inner element can be extended telescopically from an outlet end of the outer tube. The inner element is preferably fully insertable into the outer tube in order to create a linear drive that is as compact as possible.

An inner connecting element for connecting the linear drive to the closure element or to the body is attached to the end of the inner element that can be pulled out of the outer tube. The inner connecting element comprises, for example, a ball socket, a ball stud, an eyelet or a bolt.

The linear drive comprises a screw spring arranged radially relative to the drive axis between the inner element and the outer tube. With its spring force, the screw spring can support the inner element being pulled out of the outer tube or the inner element being pushed into the outer tube. For example, the screw spring is made of a metal, in particular steel, to provide sufficient elasticity and spring force.

The linear drive comprises an inner support element fixed to the inner element coaxially with the drive axis and an outer support element fixed to the outer tube coaxially with the drive axis, wherein the screw spring is clamped coaxially with the drive axis between the inner support element and the outer support element. The spring force of the screw spring can be transmitted via the inner support element and via the outer support element to the inner element and to the outer tube, so that the screw spring can support the inner element being pulled out of the outer tube or the inner element being pushed into the outer tube.

The outer support element can be axially fixed to the outer tube, for example, by the screw spring pressing the outer support element against the support element attached to the outer tube.

The inner support element can be fixed to the inner tube, for example, by the screw spring pressing the inner support element against a snap ring inserted into a bead of the inner element that runs around the drive axis.

The inner support element and/or the outer support element is preferably made of a plastic in order to minimize friction and noise caused by contact with the screw spring and/or with the inner element.

The inner support element and/or the outer support element is preferably designed to be rotationally symmetrical to the drive axis and/or to have a central opening through which the inner element is guided. Preferably, the outer support element guides the inner element along the drive axis.

The linear drive comprises a securing element arranged between the screw spring and the inner connecting element and extending at least in portions around the inner element for securing the screw spring against escaping from the linear drive. The securing element increases the safety of the linear drive by preventing the screw spring from escaping even if the support of the screw spring on the outer support element and/or on the inner support element fails.

Radial to the drive axis, the outer diameter of the securing element is larger than the inner diameter of the screw spring. This allows the screw spring to be supported on the securing element so that the securing element can hold the screw spring in the linear drive.

Radial to the drive axis, the inner diameter of the securing element is smaller than the outer diameter of the inner closure element. This prevents the screw spring from pushing the securing element out of the linear drive beyond the inner connecting element without the need for an additional component to fix the securing element in place. This results in a particularly safe and particularly simple linear drive.

The inner element is displaceable relative to the securing element along the drive axis. This allows the inner element to be pulled out of the outer tube without taking the securing element with it. As the securing element has a larger diameter radially relative to the drive axis than the inner element, by not taking along the securing element, the installation space required for the linear drive radially relative to the drive axis is reduced.

The linear drive preferably comprises a support element, wherein the outer support element is supported on the outer tube via the support element. With the aid of the support element, the outer support element can be reliably fixed coaxially with the outer tube without the need for a specially shaped outer tube.

The support element is preferably arranged at least in portions, in particular completely, in the outer tube in order to achieve a particularly compact linear drive. The support element is attached to the outer tube, for example, by shaping the outer tube towards the drive axis, in particular by a bead of the outer tube extending around the drive axis or by a plurality of point-shaped indentation points arranged around the drive axis.

The inner element can preferably be pulled out of the outer tube through the support element, which is for example hollow cylindrical in shape and/or arranged coaxially with the drive axis, wherein the support element preferably guides the inner element along the drive axis. The support element is made of a plastic, for example, in particular a fiber-reinforced plastic, in order to guide the inner element with low friction.

The securing element is preferably arranged in the outer tube, preferably coaxially with the drive axis between the outer support element and the support element. An arrangement in the outer tube results in a particularly compact linear drive.

Between the outer support element and the support element, the securing element can be fixed coaxially with the drive axis particularly easily, for example by the screw spring pressing the securing element against the support element via the outer support element. In addition, direct contact between the screw spring and the securing element, which could lead to increased friction or increased noise if the screw spring and the securing element are made of metal, is avoided. Further, a side of the outer support element facing the screw spring can be designed independently of the securing element, for example in order to achieve the most reliable possible support of the screw spring on the outer support element and/or the simplest possible feed-through of the inner element through the outer support element.

The outer support element spaces apart the securing element, preferably radially relative to the drive axis, from the outer tube and/or from the inner element. This prevents direct contact between the outer tube and/or the inner tube and the securing element, which could lead to increased friction or increased noise if the outer tube and/or the inner tube and the securing element are made of metal.

The securing element can, for example, be arranged in a recess in a side surface of the outer support element facing the support element, wherein the recess extends around the drive axis in a ring-shaped manner, for example. This allows the securing element to be pre-assembled in the recess in a simple manner and then to be installed into the linear drive together with the external support element. For example, the securing element can be clamped in the recess and/or held in the recess by at least one latching tab of the outer support element. The latching tab is preferably arranged on a guide tongue of the outer support element described in more detail below, so that the latching tab can be moved elastically towards the drive axis with the guide tongue when the securing element is inserted into the outer support element and then springs back with the guide tongue in order to securely fix the securing element to the outer support element. Preferably, the springing back of the guide tongue is supported by pushing the inner element into the outer support element.

The securing element is preferably made of a material with a higher heat resistance than the outer support element and/or the support element. This allows the securing element to secure the screw spring even if the outer support element and/or the support element fail due to excessive temperature, in particular in the event of a fire.

The securing element is preferably made of a metal, particularly preferably of steel. This makes the securing element easy and inexpensive to manufacture and sufficiently heat-resistant.

The securing element is preferably a ring washer. In this form, the securing element can achieve its object with particularly low material costs. Preferably, the securing element is arranged coaxially with the drive axis and/or the inner element is guided through a central opening of the securing element.

The outer support element preferably comprises a centering element for centering the inner element in the outer tube, wherein the centering element preferably comprises an insertion funnel for inserting the inner element along the drive axis into the outer support element and/or a number of, for example one, two, three, four, five or six, guide tongues arranged between the inner element and the support element. In the direction from the outer support element into the support element, the guide tongues extend conically towards the drive axis, for example, in order to facilitate insertion of the outer support element into the support element. The guide tongues can be bent radially outwards from the drive axis, for example by inserting the inner element into the outer support element, so that the inner element can be easily inserted into the outer support element. The centering element and, in particular, the insertion funnel and the guide tongues facilitate the assembly of the linear drive.

The outer support element preferably comprises a spring recess on a side facing away from the support element for receiving a portion of the screw spring, wherein the spring recess extends around the drive axis in a ring-shaped manner, for example. In the spring recess, the screw spring can be supported particularly securely on the outer support element.

The linear drive preferably comprises a further securing element arranged between the screw spring and a drive end of the outer tube opposite the outlet end and extending at least in portions around the inner element for securing the screw spring against escaping from the linear drive. The further securing element further increases the safety of the linear drive by additionally securing the screw spring.

Radial to the drive axis, an outer diameter of the further securing element is preferably larger than an inner diameter of the screw spring. This allows the screw spring to be supported on the further securing element so that the further securing element can prevent the screw spring from escaping.

The further securing element is preferably fixed to the inner element coaxially with the drive axis, and the further securing element is preferably displaceable relative to the outer tube along the drive axis. By fixing it to the inner element, the further securing element is moved along with the inner element when the inner element is pulled out of or pushed into the outer tube, so that the further securing element remains close to the screw spring and can prevent the screw spring from exiting particularly effectively.

The further securing element is preferably a ring washer or a snap ring. In this form, the further securing element can achieve its object with a particularly low amount of material. Preferably, the further securing element is arranged coaxially with the drive axis and/or the inner element is guided through a central opening of the further securing element.

The further securing element is fixed coaxially with the inner element, for example, by the further securing element or a snap ring fixing the further securing element being arranged in portions in a bead of the inner element that extends around the drive axis.

The further securing element is preferably arranged in the outer tube. This makes the linear drive particularly compact.

The inner support element is preferably arranged coaxially with the drive axis, at least in portions, between the screw spring and the further securing element. This allows the inner support element to be fixed coaxially with the inner element by the screw spring pressing the inner support element against the further securing element, without further components being necessary for fixing the inner support element.

The outer support element is preferably arranged at least in portions radially relative to the drive axis between the outer tube and the screw spring and is configured for the outer guidance of at least one portion of the screw spring along the drive axis, and/or the inner support element is arranged at least in portions radially relative to the drive axis between the inner element and the screw spring and is configured for the inner guidance of at least one portion of the screw spring along the drive axis.

With the aid of the outer support element and/or inner support element configured for guiding the screw spring, the screw spring can be guided with particularly high precision, low friction and low noise, without further components or special designs of the screw spring being necessary. A guidance of the screw spring through the outer support element and the inner support element can be designed, for example, as described in patent application DE 10 2020 132 508 A1.

The screw spring is preferably clamped between the inner support element and the outer support element such that the screw spring is compressed against a spring force of the screw spring when the inner element is pulled out of the outer tube. This so-called "paradoxical arrangement" results in a particularly compact linear drive. The paradoxical arrangement can be designed, for example, as described in patent application DE 10 2020 132 508 A1.

The linear drive preferably comprises a drive unit for the motorized drive of a pull-out movement and/or a push-in movement of the inner element from the outer tube and/or into the outer tube.

For example, the drive unit is attached to the outer tube at the drive end of the outer tube opposite the outlet end. The drive unit comprises, for example, an electric motor and/or a spindle gear for driving the pull-out movement and/or the push-in movement of the inner element.

An outer connecting element for connecting the linear drive to the closure element or to the body is attached to one end of the drive unit facing away from the outer tube, for example.

BRIEF DESCRIPTION OF THE DRAWINGS

Further advantages, objectives and properties of the invention are explained with reference to the following description and the accompanying drawings, in which exemplary subject matters according to the invention are shown.

DETAILED DESCRIPTION

Figure 1:
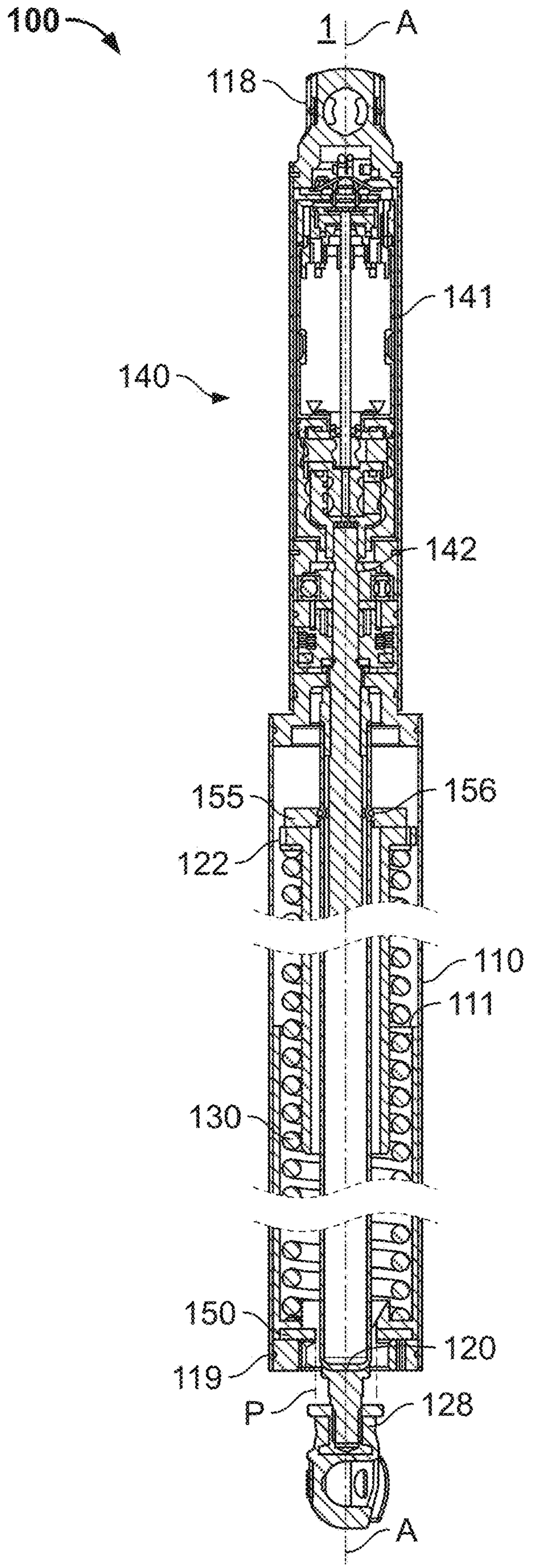
FIG. 1 shows a schematic longitudinal section of a linear drive according to the invention.

FIG. 1 shows a schematic longitudinal section along the drive axis A of a linear drive 100 according to the invention.

The linear drive 100 shown comprises an outer tube 110, which, for example, is hollow cylindrical and arranged coaxially with the drive axis, for example with a support element 119 attached to an outlet end of the outer tube 110.

The linear drive 100 shown comprises an inner element 120 arranged in the outer tube 110, which for example is also hollow cylindrical and arranged coaxially with the drive axis.

The inner element 120 is guided along a drive axis A of the linear drive 100, so that the inner element 120 can be extended telescopically from the outlet end of the outer tube 110, for example through the support element 119.

An inner connecting element 128, for example a ball socket, is attached to the end of the inner element 120 that can be pulled out of the outer tube 110 for connecting the linear drive 100 to a closure element or to a body of a motor vehicle The linear drive 100 shown comprises a screw spring 130 arranged radially relative to the drive axis A between the inner element 120 and the outer tube 110, an inner support element 122 fixed to the inner element 120 coaxially with the drive axis A, and an outer support element 111 fixed to the outer tube 110 coaxially with the drive axis A. The screw spring 130 is clamped coaxially with the drive axis A between the inner support element 122 and the outer support element 111.

For example, the outer support element 111 is supported on the outer tube 110 via the support element 119. The outer support element 111 guides the inner element 120 along the drive axis A, for example.

The linear drive 100 shown comprises a securing element 150 arranged between the screw spring 130 and the inner connecting element 128 and extending around the inner element 120 for securing the screw spring 130 against escaping from the linear drive 100. The securing element 150 is, for example, a ring washer arranged in particular coaxially with the drive axis A.

Radial to the drive axis A, an outer diameter of the securing element 150 is larger than an inner diameter of the screw spring 130, and an inner diameter of the securing element 150 is smaller than an outer diameter of the inner connecting element 128. The latter is illustrated in FIG. 1 by the projection P of the inner diameter of the securing element 150 along the drive axis A onto the inner connecting element 128.

The inner element 120 is displaceable relative to the securing element 150 along the drive axis A, in particular through the securing element 150.

The securing element 150 shown is arranged in the outer tube 110 coaxially with the drive axis A between the outer support element 111 and the support element 119, for example in a recess in a side surface of the outer support element 111 facing the support element 119.

The outer support element 111 shown, radially relative to the drive axis A, spaces apart the securing element 150 from the outer tube 110 and from the inner element 120.

The linear drive 100 shown comprises a further securing element 155 arranged between the screw spring 130 and a drive end of the outer tube 110 opposite the outlet end and extending around the inner element 120 for securing the screw spring 130 against escaping from the linear drive 100. The further securing element 155 is, for example, a ring washer arranged coaxially with the drive axis A.

Radial to the drive axis A, an outer diameter of the further securing element 155 is larger than an inner diameter of the screw spring 130.

The further securing element 155 is fixed coaxially with the drive axis A on the inner element 120, for example by a snap ring 156 arranged partially in a bead in the inner element 120 extending around the drive axis A.

The further securing element 155 is arranged, for example, in the outer tube 110 and is displaceable relative to the outer tube 110 along the drive axis A.

The inner support element 122 shown is arranged in portions axially with the drive axis A between the screw spring 130 and the further securing element 155.

The outer support element 111 shown is arranged in portions radially relative to the drive axis A between the outer tube 110 and the screw spring 130, and is configured for the external guidance of a portion of the screw spring 130 along the drive axis A.

The inner support element 122 shown is arranged in portions radially relative to the drive axis A between the inner element 120 and the screw spring 130, and is configured for the internal guidance of a portion of the screw spring 130 along the drive axis A.

The shown screw spring 130 is clamped between the inner support element 122 and the outer support element 111 such that the screw spring 130 is compressed against a spring force of the screw spring 130 when the inner element 120 is pulled out of the outer tube 110.

The linear drive 100 shown comprises a drive unit 140 for the motorized drive of a pull-out movement and a push-in movement of the inner element 120 from the outer tube 110 and into the outer tube 110.

The drive unit 140 shown is attached to the outer tube 110 at the drive end of the outer tube 110 opposite the outlet end. The drive unit 140 comprises, for example, an electric motor 141 and a spindle gear 142 for driving the pull-out movement and the push-in movement of the inner element 120.

For example, an outer connecting element 118 for connecting the linear drive 10 to the closure element or to the body is attached to an end of the drive unit 140 facing away from the outer tube 110.

Figure 2:
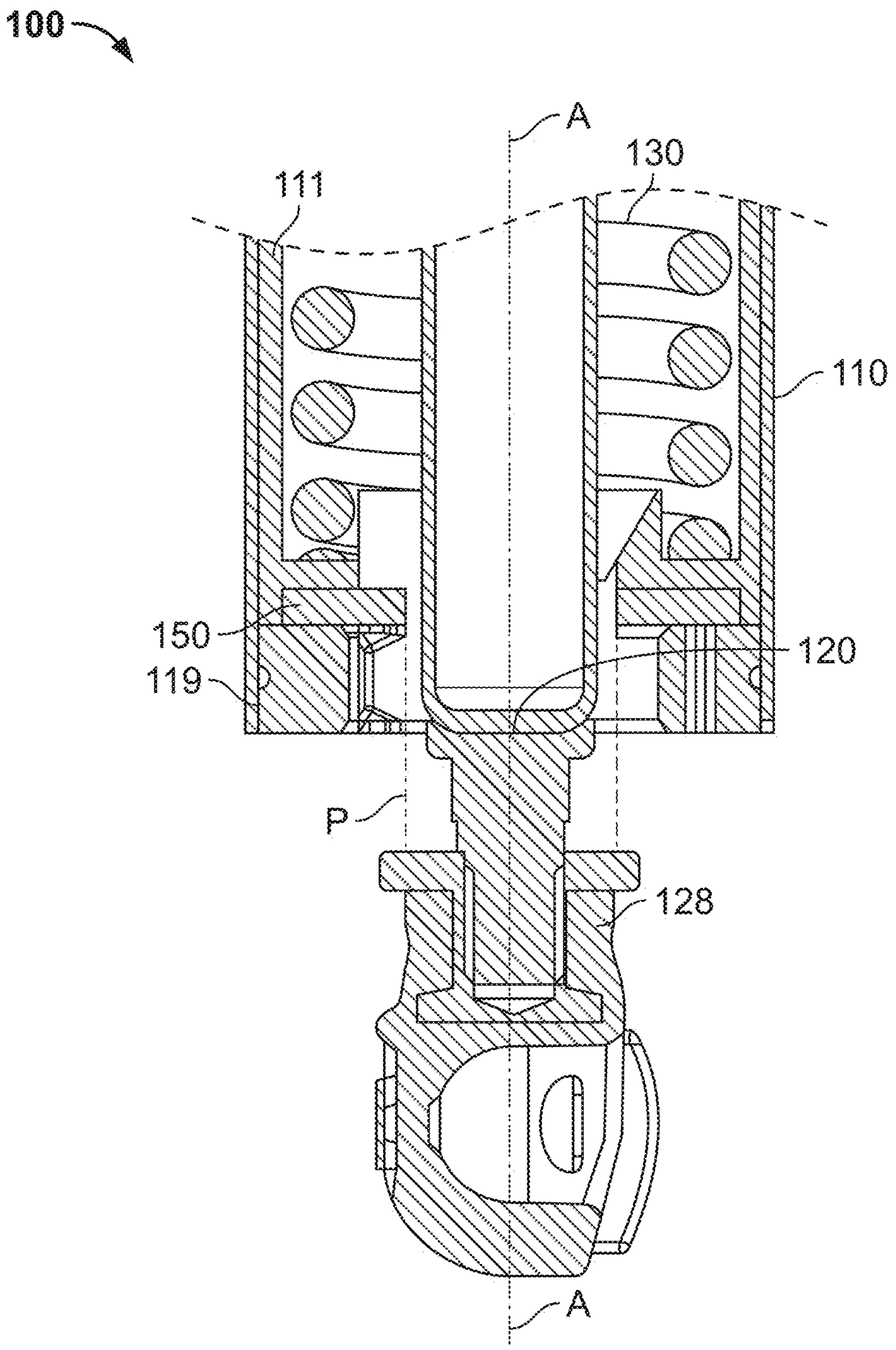
FIG. 2 shows an enlarged section from FIG. 1 in the region of the securing element.

FIG. 2 shows an enlarged section from FIG. 1 in the region of the securing element 150.

Figure 3:
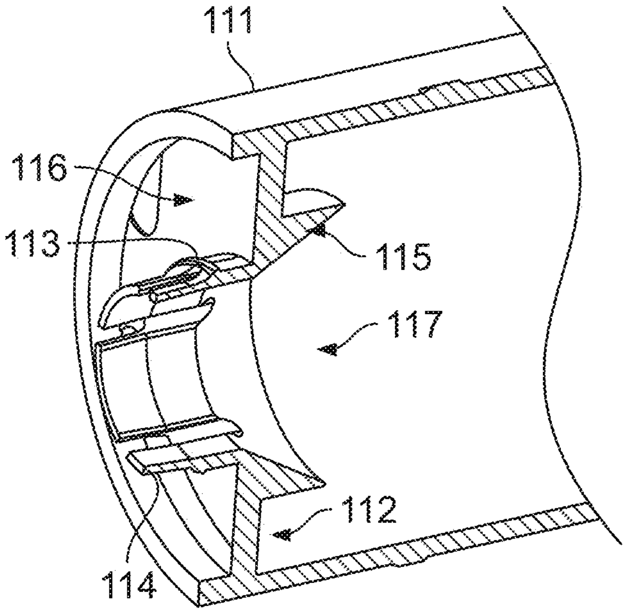
FIG. 3 shows a schematic perspective view of the outer support element of a linear drive according to the invention.

FIG. 3 shows a schematic perspective view of the outer support element 111 of a linear drive 100 according to the invention.

The outer support element 111 shown comprises a centering element 117 for centering the inner element 120 in the outer tube 110. The centering element 117 shown comprises an insertion funnel 115 for inserting the inner element 120 along the drive axis A into the outer support element 111 and, for example, four guide tongues 114 to be arranged between the inner element 120 and the support element 119.

The outer support element 111 shown comprises a recess 116 in a side surface of the outer support element 111 facing the support element 119 for receiving the securing element 150, wherein the recess 116 extends around the drive axis A in a ring-shaped manner, for example.

The outer support element 111 shown comprises, for example, four latching tabs 113 for mounting the securing element 150 in the recess 116. The latching tabs 113 are preferably arranged on the guide tongues 114 of the outer support element 111. For example, the latching tabs 113 project radially outwards from the drive axis A over the guide tongues 114 and together form an annular projection coaxial with the drive axis A.

The outer support element 111 shown comprises a spring recess 112 on a side facing away from the support element 119 for receiving a portion of the screw spring 130, wherein the spring recess 112 extends around the drive axis A in a ring-shaped manner, for example.

Figure 4:
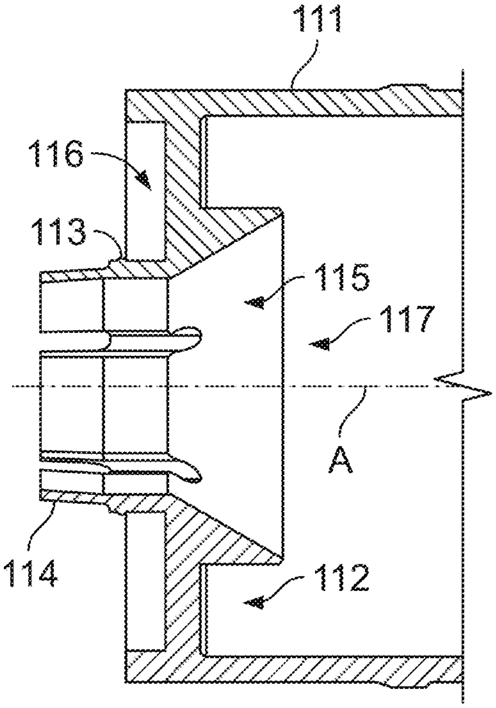
FIG. 4 shows a schematic longitudinal section of the outer support element from FIG. 3.

FIG. 4 shows a schematic longitudinal section along the drive axis A of the outer support element 111 of FIG. 3.

The invention claimed is:

1. A linear drive for moving a closure element of a motor vehicle relative to a body of the motor vehicle, the linear drive comprising a. an outer tube having an outlet end, b. an inner element arranged at least partially in the outer tube, the inner element having an end that can be pulled out of the outer tube, i. wherein the inner element is telescopically extendable along a drive axis (A) of the linear drive through the outlet end of the outer tube, and ii. wherein an inner connecting element for connecting the linear drive to the closure element or to the body is attached to the end of the inner element, c. a screw spring arranged radially relative to the drive axis (A) and disposed between the inner element and the outer tube, d. an inner support element fixed to the inner element and coaxially aligned with the drive axis (A), and e. an outer support element non-movably fixed to the outer tube and coaxially aligned with the drive axis (A), wherein the screw spring is clamped coaxially with the drive axis (A) between the inner support element and the outer support element, characterized in that f. the linear drive comprises a securing element arranged between the screw spring and the inner connecting element and extending at least in portions around the inner element for securing the screw spring against escaping from the linear drive, wherein the securing element is disposed within a recess of the outer support element, g. wherein, radially to the drive axis (A), an outer diameter of the securing element is larger than an inner diameter of the screw spring, h. wherein, radially to the drive axis (A), an inner diameter of the securing element is smaller than an outer diameter of the inner connecting element, and i. wherein the inner element is displaceable relative to the securing element along the drive axis (A).

2. The linear drive according to claim 1, a. wherein the linear drive comprises a support element, b. wherein the outer support element is supported on the outer tube via the support element, c. wherein the securing element is arranged in the outer tube between the outer support element and the support element.

3. The linear drive according to claim 2, a. wherein the outer support element comprises a centering element for centering the inner element in the outer tube, b. wherein the centering element comprises an insertion funnel for inserting the inner element along the drive axis (A) into the outer support element and/or a number of guide tongues arranged between the inner element and the support element.

4. The linear drive according to claim 2, wherein the securing element is made of a metal with a higher heat resistance than the outer support element and/or the support element.

5. The linear drive according to claim 1, wherein the outer support element, radially relative to the drive axis (A), spaces apart the securing element from the outer tube and/or from the inner element.

6. The linear drive according to claim 1, wherein the securing element is a ring washer.

7. The linear drive according to claim 1, wherein a. the linear drive comprises a further securing element arranged between the screw spring and a drive end of the outer tube opposite the outlet end and extending at least in portions around the inner element for securing the screw spring against escaping from the linear drive, b. an outer diameter of the further securing element is larger than the inner diameter of the screw spring.

8. The linear drive according to claim 7, wherein a. the further securing element is fixed coaxially with the drive axis (A) on the inner element, and b. the further securing element (155) is displaceable relative to the outer tube (110) along the drive axis (A).

9. The linear drive according to claim 8, wherein the inner support element is arranged coaxially with axially to the drive axis (A) at least in portions between the screw spring and the further securing element.

10. The linear drive according to claim 1, wherein a. the outer support element is arranged at least in portions radially relative to the drive axis (A) between the outer tube and the screw spring, and is configured for guiding at least a first portion of the screw spring along the drive axis (A), and b. the inner support element is arranged at least in portions radially relative to the drive axis (A) between the inner element and the screw spring, and is configured for guiding at least a second portion of the screw spring along the drive axis (A).

11. The linear drive according to claim 1, wherein the screw spring is clamped between the inner support element and the outer support element such that the screw spring is compressed against a spring force of the screw spring when the inner element is pulled out of the outer tube.

12. The linear drive according to claim 1, wherein a. the outer support element is arranged at least in portions radially relative to the drive axis (A) between the outer tube and the screw spring, and is configured for guiding at least a first portion of the screw spring along the drive axis (A), and b. the inner support element is arranged at least in portions radially relative to the drive axis (A) between the inner element and the screw spring, and is configured for guiding at least a second portion of the screw spring along the drive axis (A).

13. The linear drive according to claim 1, wherein the outer support element is arranged at least in portions radially relative to the drive axis (A) between the outer tube and the screw spring, and is configured for guiding at least a portion of the screw spring along the drive axis (A).

14. The linear drive according to claim 1, wherein the inner support element is arranged at least in portions radially relative to the drive axis (A) between the inner element and the screw spring, and is configured for guiding at least a portion of the screw spring along the drive axis (A).

* * * * *